United States Patent
Harwood

(10) Patent No.: US 7,391,159 B2
(45) Date of Patent: *Jun. 24, 2008

(54) LIGHTING DEVICE WITH MULTIPLE POWER SOURCES AND MULTIPLE MODES OF OPERATION

(76) Inventor: Ronald Paul Harwood, 31110 Applewood, Farmington Hills, MI (US) 48331

( * ) Notice: Subject to any disclaimer, the term of this patent is extended or adjusted under 35 U.S.C. 154(b) by 0 days.

This patent is subject to a terminal disclaimer.

(21) Appl. No.: 11/748,066

(22) Filed: May 14, 2007

(65) Prior Publication Data

US 2007/0211461 A1    Sep. 13, 2007

Related U.S. Application Data

(63) Continuation of application No. 11/374,545, filed on Mar. 13, 2006, now Pat. No. 7,218,056.

(51) Int. Cl.
 *H05B 37/00* (2006.01)
(52) U.S. Cl. .................... 315/86; 315/307; 307/66
(58) Field of Classification Search ............... 315/86, 315/312, 291, 307; 307/18, 23–29, 31, 64–66; 340/693.1, 693.2, 693.3, 333, 286.13; 362/20, 362/227, 249
See application file for complete search history.

(56) References Cited

U.S. PATENT DOCUMENTS

| | | | |
|---|---|---|---|
| 5,365,145 A * | 11/1994 | Fields | ............... 315/86 |
| 5,633,629 A | 5/1997 | Hochstein | |
| 5,924,784 A | 7/1999 | Chliwnyj et al. | |
| 5,929,781 A | 7/1999 | Vosika | |
| 6,860,628 B2 | 3/2005 | Robertson et al. | |
| 6,929,376 B2 | 8/2005 | Harris | |
| 7,132,804 B2 * | 11/2006 | Lys et al. | ............... 315/292 |
| 2002/0176250 A1 | 11/2002 | Bohler et al. | |
| 2003/0072145 A1 | 4/2003 | Nolan et al. | |
| 2003/0072157 A1 | 4/2003 | Nolan et al. | |
| 2004/0012959 A1 | 1/2004 | Robertson et al. | |
| 2004/0032727 A1 | 2/2004 | Cok | |
| 2004/0042198 A1 | 3/2004 | Cok | |
| 2004/0135522 A1 | 7/2004 | Berman et al. | |
| 2004/0170015 A1 | 9/2004 | Hamrick | |
| 2004/0174706 A1 | 9/2004 | Kan | |
| 2004/0218387 A1 | 11/2004 | Gerlach | |
| 2004/0263094 A1 | 12/2004 | Lister | |
| 2005/0073845 A1 | 4/2005 | Matsui | |
| 2005/0083696 A1 | 4/2005 | Chiang et al. | |
| 2005/0286265 A1 | 12/2005 | Zampini et al. | |
| 2006/0146553 A1 | 7/2006 | Zeng et al. | |

\* cited by examiner

*Primary Examiner*—Thuy Vinh Tran
(74) *Attorney, Agent, or Firm*—Brooks Kushman P.C.

(57) ABSTRACT

Lighting device having a number of light sources for illumination an area around the lighting device. The lighting device including capabilities for generating illumination when a primary power source is unavailable. The light device may include a secondary power source for use in powering the lighting device when the primary power source is unavailable. The lighting device may include multiple operating modes, optionally depending on the active power source.

21 Claims, 2 Drawing Sheets

LIGHTING DEVICE WITH MULTIPLE POWER SOURCES AND MULTIPLE MODES OF OPERATION

CROSS-REFERENCE TO RELATED APPLICATIONS

This application is a continuation of U.S. patent application Ser. No. 11/374,545, filed Mar. 13, 2006, which is now U.S. Pat. No. 7,218,056 B1.

BACKGROUND OF THE INVENTION

1. Field of the Invention

The present invention relates to lighting devices having a number of light sources for emitting light to surrounding areas.

2. Background Art

Any electrically operable element having capabilities for emitting light be may considered as a light source. Light sources may include any number of features for controlling the operation thereof, and typically include some form of light socket for receiving electrical power from a main power source, such as a power outlet.

If the main power source is lost, i.e., if power failure occurs and the light socket no longer receives power, the lighting device is unable to generate light. The inability of some lighting devices to generate light when the main source of power is lost can be problematic in many situations where continued lighting may be desired.

SUMMARY OF THE INVENTION

Accordingly, one non-limiting aspect of the present invention relates to a lighting device having capabilities to continue light generation after power loss to a main power source.

One non-limiting aspect of the present invention relates to a lighting device having at least two light sources mounted on a single printed circuit board (PCB). The light sources may be configured to emit light as a function of current received through the PCB. The lighting device may further include a battery configured to store power and a controller configured to receive power from a power source and the battery and to control power distribution therefrom. The controller may be configured to distribute power from the power source to two or more of the light sources during normal operation and to distribute power from the battery to a limited number of light sources during backup operation, the limited number of light sources being less than the number of light sources powered during normal operation.

One non-limiting aspect of the present invention relates to a lighting device having a number of light sources mounted on a common printed circuit board (PCB) and a controller for distributing power from a main power source and a secondary battery power source to a selective one or more of the light sources according to a first mode and second mode of operation. The first mode of operation may be associated with non-emergency illumination and the second mode operation may be associated with emergency illumination.

One non-limiting aspect of the present invention relates to a controller for using with a lighting device having a battery and a number of light sources mounted on a common electrical conductor within a single light transmissible housing. The controller may be configured for distributing power from a powerline power source and the battery to selectively illuminate the lighting sources according to at least a first and second mode of operation. Optionally, the first mode of operation may be associated with non-emergency illumination and the second mode operation may be associated with emergency illumination.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
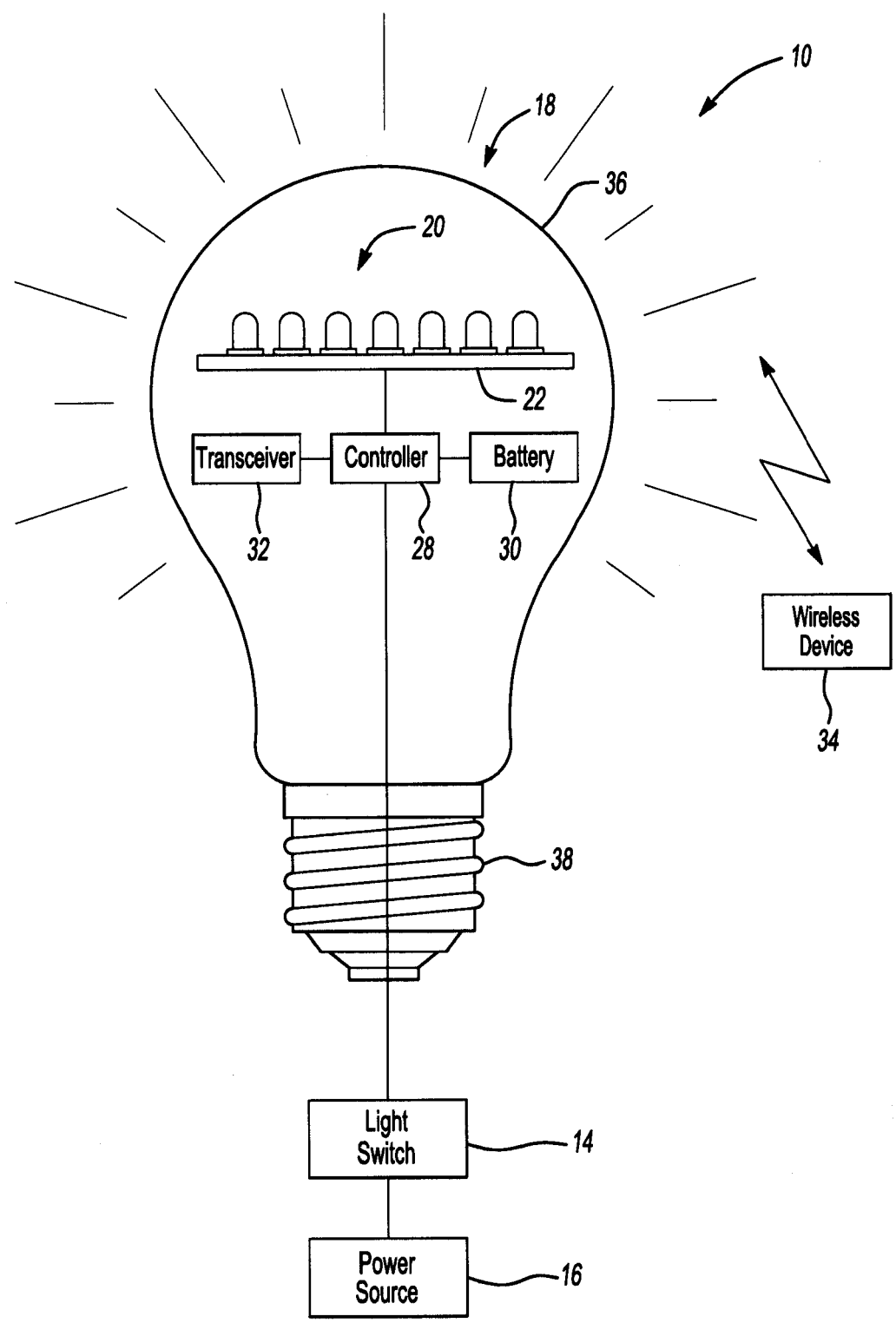
FIG. 1 illustrates a lighting system in accordance with one non-limiting aspect of the present invention.

FIG. 1 illustrates a lighting system 10 in accordance with one non-limiting aspect of the present invention. The lighting system 10 may be used to support lighting operations in any number of environments. For exemplary purposes, and without intending to limit the scope and contemplation of the present invention, the present invention is explained with respect to a common lighting application where a light switch 14 is used to control power flow from a power source 16 to a lighting device 18. Of course, the lighting device 16 may be used in any number of applications, such as with emergency lighting fixtures that are hardwired to a power source, i.e., the power thereto is not controlled by a light switch.

The light switch 14 may be a wall-mounted flip-switch configured to communicate electric power from the power source 16 to the lighting device 18. Of course, the present invention is not limited to wall-mounted flip-switches and fully contemplates the use of any other human or non-human actuated features having capabilities to control power delivery to the lighting device 18. The power delivered to the lighting device 18 ay be converted to light for illuminating an area surrounding the lighting device 18, such as to illuminate a path of egress.

The power source 16 may be any alternating current (AC) or direct current (DC) power supply. For example, the power source may be associated with a power line used to deliver 120V AC current at 60 Hz or any other suitable voltage or power level, such as is commonly found in residential and industrial applications where egresses are commonly illuminated with one or more lighting devices.

The power supplied to the lighting device 18 may be converted to light with a number of light sources 20. The light sources 20 may be light emitting diodes (LEDs), incandescent bulbs, combinations of any source, fluorescent, high intensity discharge, or any other discrete lighting element that may be mounted to a printed circuit board (PCB) 22 or other suitable current conducting element. The PCB 22 may be configured to support separate traces for one or more of the light sources 20 so that separate current paths can be used to individually deliver current to each light source 20 or one or more groups of light sources 20.

A controller 28 may be included to control operation of the lighting device 18. The controller 28 may be configured to receive current from the power source 16 and to individually control current delivery to each of the light sources 20. For example, the controller 28 may selectively control current flow to each current path, and thereby, the number of illuminated light sources 20, i.e., those receiving current. The controller 28 may also control the amount of current delivered over each current path so as to not only control the number of illuminated light sources but also the power consumption of the light sources 20.

The controller 28 may include any number of features suitable for controlling the distribution of power within the lighting device 18. The controller 28 may include a processor, memory, circuit elements, and other features necessary to facilitate operations in accordance with the present invention. The controller 28 is schematically illustrated to receive power from the power source 16 and to deliver power to the circuit board 22. The controller 28 may be embedded or otherwise loaded with a program or other executable configuration to facilitate controlling the operation thereof.

The lighting device 18 may include a battery 30 or other power storage element having capabilities for storing electrical energy (either within the housing of the device, within the PCB, or remote). The battery 30 may be connected to the controller 28 to facilitate its charging and discharging. The controller 28 may be configured to meter electrical power from the power source 16 to the battery 30 for controlling battery charging. Once charged, the controller 28 may be configured to controllably discharge energy from the battery 30 for illuminating the light sources 20, such as to permit operation of the lighting device 18 in the absence of power from the power source 16.

A wireless transceiver 32 may be included for interfacing wireless signals with the controller 28. The transceiver 32 may be configured to support any number of wireless transmission protocols and operations. The wireless signals may be used by the controller 28 to control lighting operations and to communicate messages and other data to another remotely located wireless devices 34. The remotely located wireless device 34 may be a programming source used to program operation of the lighting device 18, the wireless transceiver of an adjoining lighting fixture, and or some other wireless device, such as a wireless device used to communicate emergency broadcast messages, such as from an emergency response entity, smoke detector, heat sensor, etc.

Optionally, the foregoing features of the lighting device 18 may be included within a protective housing 36. The protective housing 36 may comprise a plastic, glass, or other light transmissible material having suitable properties for protecting the elements included therein. FIG. 1 illustrates the housing 36 being configured to mimic a commonly used incandescent light bulb and having a corresponding structure with electrically conducting threads 38 to facilitate screwing the lighting device 18 into a light socket (not shown).

The threads 38 provided an electrical connection between the power source 16 and the controller 28 to facilitate the above-described distribution of electrical power. The threads 38 allow the lighting device 18 to be screwed into a commonly available outlet such that the lighting device 18 may be used as a replacement for incandescent light bulbs. For example, if the light sources 20 are LEDs, the lighting device 18 may be used in place of incandescent light bulbs in order to provided improved durability and reduced power consumption coupled with the capability of providing emergency or night time lighting when occupancy is reduced and illumination needs are minimal.

Figure 2:
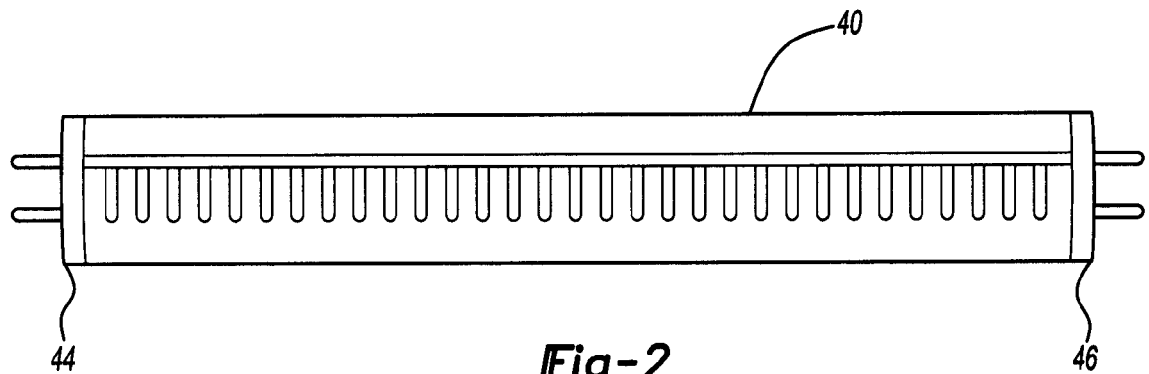
FIG. 2 illustrates the lighting device having a housing intended to mimic fluorescent lighting fixtures in accordance with one non-limiting aspect of the present invention.

Of course, the housing 36 may be configured to include any number of sizes and shapes, including those associated with fluorescent lighting fixtures and the like. FIG. 2 illustrates the lighting device 18 having a housing 40 intended to mimic fluorescent lighting fixtures with electrically conducing end caps 44-46 used in place of the threaded conductor to electrically connect the controller (not shown) to a power supply (not shown).

The controller 28 may be a programmable controller in that it can be instructed to control various lighting operations of the lighting device 18 as a function of various lighting control signals. The lighting control signals may specify various operation parameters and conditions for use by the controller 28 in selectively controlling lighting operations. In more detail, the lighting control signals may be used to specify desired operating parameters of the lighting device 18 for particular operating conditions.

One programmable aspect of the present invention relates to defining different modes of operation for the lighting device 18. The different modes of operation may be used to define different operating parameters for the lighting device 18 as function of attendant operating conditions. The ability to program the controller 28 to automatically execute different control strategies can be helpful in any number of environments.

For example, a first operating mode may be assigned to one set of operating conditions and a second operating mode may be assigned to another set of operating conditions. Depending on the attendant operating conditions, the controller 28 may control lighting operations according to the correspond operating mode. The condition for switching between operating modes may be specified according to any number of variables.

One programmable condition may relate to intended operation of the lighting device 18. For example, the lighting device may be intended to operate with a common residential power line having 120V AC at 60 Hz. As such, if the lighting device 18 is operating as intended, i.e., receiving the desired power level, it may be controlled to operate according to the operating parameters specified in the first mode. Similarly, if the lighting device 18 is not operating as intended, i.e., not receiving the desired power level, it may be controlled according to the operating parameters specified in the second mode.

Another programmable may relate to intended powering of the controller 28. For example, the controller 28 may be able to differential between AC power received from the power source 16 and power (DC) received from the battery 30. Rather than receiving the override signal or waiting for some other command, the controller 28 may switch from the first mode to the second mode and operate according to DC power levels if AC power is lost.

Likewise, the operating modes may be defined as a function of override signals and/or emergency signals received by the lighting device 18, in addition to or independently of the attendant operating conditions. These signals may be used, for example, to simplify operation such that the first mode is implemented until receipt of the override/emergency message dictates switching to the second mode. The lighting device 18 may be operated in the first mode under all conditions until an emergency alert message is received such that the emergency alert message triggers the controller 28 to implement the second mode of operation.

Any number of operating conditions may be defined for triggering the first and second modes of operation and the present invention is not intended to be limited to any specific set of operation conditions. Moreover, the present invention fully contemplates the use of any number of operating modes and switching back and forth between the same such that the control of the lighting device 18 may be continuously controlled by the controller 28 according to operation conditions, override and emergency alert messages, or some other form of signaling.

In addition to specifying the various operating modes and the conditions defining the selection thereof, the operating parameters of the lighting device 18 during such modes may be specified. For either of the first, second, or other modes of operation, various operating parameters may be specified and implemented by the controller 28 as a function of the currently active mode of operation. The various operating parameters may relate to any number of functions controllable by the controller 28.

One programmable operating parameter relates to controlling the number of active light sources 20. One or more of the light sources 20, as described above, may be associated with different current traces such that the controller 28 may individually control the current provided to each current trace, and thereby, the number of active light sources 20, i.e., the inactive light sources receive no current. In this manner, during the first mode of operation a selective number of light sources 20 may be active and during the second mode of operation a different number of light sources 20 may be active.

The ability to select the number of active light sources 20 can be helpful in switching the appearance of the lighting device 18. As shown, the lighting device 18 may include any number of light sources, which may be arranged in any number of patterns. The number of active light sources may be controlled to selectively displayed different patterns of the light sources, such as to provide directional illuminations and the like.

Another programmable operating parameter relates to selectively controlling the number of light sources 20 active for a given time of day. The first mode of operation may specify a first number of light sources 20 to be active and the second mode of operation may specify a different number of active light sources 20. The switching between the first and second mode be programmed to occur at a specific time of day such that the number of active light sources 20 changes therewith.

Alternatively, such as in the case where the second mode is triggered by an emergency alert or in other situations in which it may be undesirable to switch between modes, the number of active light sources 20 may be controlled without switching to the second mode of operation. Rather, the first mode of operation may itself specify the number of active light sources as function of the time of day or some other definable interval/increment such that the number of active light sources may vary without the controlling switching between different modes of operation.

Another programmable operating parameter relates to selectively controlling lighting sequences of the light sources 20. This may include a combination of the above-described parameters such that light sources are controlled in a more complex manner than simply being turned on and off, such as by controlling different numbers of the light sources 20 to flash according to some pattern or program, mixing various light sources 20 to produce desired colors of light, and any number of other operations.

Conditional response can activate any number of light sources 20 within the PCB 22 so as to create a color such as green or red to indicate safe and not safe conditions within the illuminated areas. In this instance, the controller 28 may receive remote triggers from other devices 34 such as smoke and heat sensors, or any number of other wireless sources. Similar conditional response can be a coordinated strobe effect where prescribed light emitters within the system can illuminate in any number of sequences to indicate the desired path of entrance or egress.

Another programmable operating parameter relates to selectively controlling light output levels and/or power consumption of the light sources 20. This control can be helpful in controlling power consumption of the active light sources 20, regardless of the mode of operation. Power consumption can be key component in defining system costs and setting energy conservation strategies.

The programming of the lighting device 18 with these and other conditions and parameters may occur through any number of interactions with the lighting device 18, and in particular, with the controller 28. The controller 28 may be loaded with an application to control illumination of the light sources 20 such that the initial characteristics of the various operating modes are pre-loaded on the lighting device 18. Thereafter and/or in place thereof, the controller 28 may be programmed and/or re-programmed once in the field through wireless or wireline communications of the lighting control signals.

The present invention contemplates an embodiment where multiple lighting devices 18 are deployed in a common environment such that the lighting devices are in communication with each other, either through wireless communication or some form of wireline communications. In this environment, a daisy-chain distribution and learning process may be employed to coordinate programming of the various lighting devices 18. The programming may consist of one lighting device 18 communication the lighting control signals to another lighting device 18 and so on until each lighting device 18 receives the necessary lighting control signals.

Figure 3:
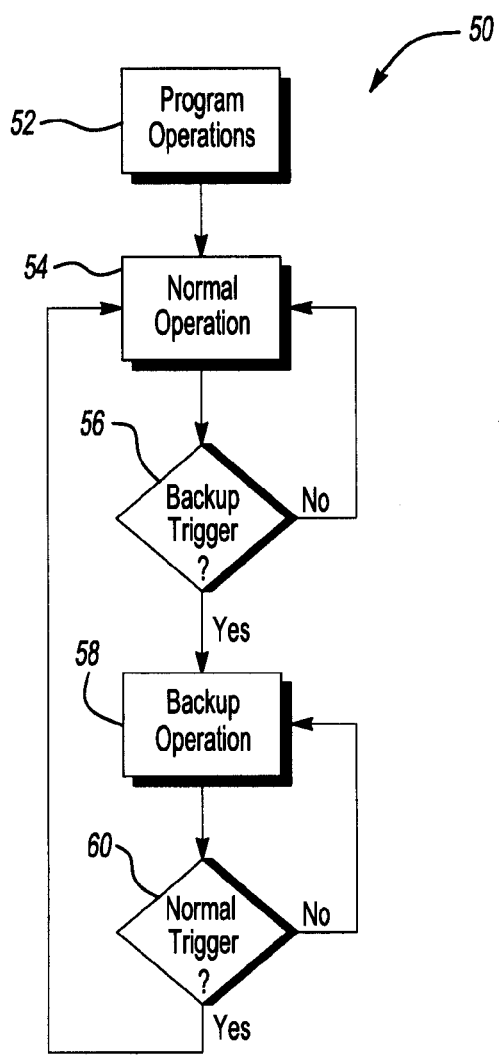
FIG. 3 illustrates a flowchart of a method of providing emergency egress lighting in accordance with one non-limiting aspect of the present invention.

FIG. 3 illustrates a flowchart 50 of a method of controlling the lighting device to provide emergency egress lighting in accordance with one non-limiting aspect of the present invention. The method may be associated with a software program or other suitable executable operable with the controller 28. The program may include instructions and any number of other features for controlling operation of the controller 28 and lighting device 18 in accordance with the method of the present invention.

The method relates to emergency egress lighting and the need to provide illumination during an emergency. The emergency may relate to any number of operating conditions in which it is desirable to provide illumination when illumination may not otherwise be provided (turn on lighting device 18) and/or when illumination is provided and the operating parameters are changed to reflect the emergency (warning, directionality, etc.). As such, the emergency may occur while the lighting device 18 is active (illuminated) and/or while the lighting device 18 is inactive (non-illuminated).

Block 52 relates to programming operations of the lighting device 18. As described above, the lighting device 18 may be programmed to operate within any number of modes and according to any number of operating parameters and conditions. Block 52 relates to programming the lighting device 18 with at least two modes of operation wherein one or more of the modes relates to normal operation and at least one of the modes relates to backup operation. The normal mode of operation is intended to corresponds with behavior of the lighting device 18 during non-emergencies and the backup mode of operation corresponds with behavior of the lighting device in response to emergencies.

The lighting device 18 may be preprogrammed with the normal and backup modes such that a user can simply purchase the lighting device 18 for retro-fitting existing lighting elements. Likewise, the programming may be executed through wireline or wireless communications with the lighting device 18. Optionally, the egress lighting application may include a number of lighting devices 18 such that one or more of the lighting devices 18 may be simultaneously programmed through a broadcasted message and/or individually programmed through some form of peer-to-peer communication where one lighting device 18 communicates the lighting control signals (signals used for programming) to another lighting device 18, and so on.

The normal mode of operation may define any number of operating parameters for the lighting device 18 depending on its desired operation. Because the present invention contemplates any number of programmable operating parameters, it is not intended to be limited in the selection thereof. The normal mode, however, may be required to at least include a normal trigger. The normal trigger may be used to define a condition for triggering control according to the parameters specified in the normal mode of operation. The use of the normal trigger is defined in more detail below.

The backup mode of operation, in contrast, may be required to specify a backup trigger and specific operating parameters for any number of operating conditions. The backup trigger defines one or more operating conditions that may be used to trigger operation according to the parameters specified in the backup mode. The backup triggers may be associated with any number of events, and for exemplary purpose, at least two of the triggers may relate to receipt of an emergency alert message and unintended loss of power to the lighting device 18.

In addition to the backup triggers, the backup mode may further define specific operating parameters for the backup mode as a function of the attendant operating conditions of the lighting device 18. As any number of conditions may arise during an emergency, the backup up mode, if intended to support emergency egress lighting during those conditions, must include one or more operating parameters for the contemplated operating conditions. If operating conditions change during the emergency, then control of the lighting device 18 may similarly change to the operating parameter defined for the new condition.

One emergency operating condition may relate to the power status of the lighting device 18 and the operating parameters for use therewith. For example, if an emergency alert message is received and the lighting device is currently receiving power from the power source 16 (i.e., the light switch is on, or in hardwired applications, the power source is active) or battery 30, the associated operating parameter may specify flashing the light sources 20, creating a direction egress pattern, or generating some other warning.

If the emergency alert message is received and the controller 28 is not receiving power from the power source 16 (i.e., the light switch is off and/or power is otherwise lost), the associated operating parameter may specify powering the light sources with battery power. Optionally, as battery power may be somewhat limited, the operating parameters may specify controlling power consumption of the light sources as a function of battery power. Any number of battery power consumption strategies may be employed.

One battery power consumption strategy may include limiting the number of active light sources 20 as a function of battery energy levels. For example, the operating parameters may specify activating some limited number of light sources 20 (optionally, less than the number typically active during normal operation) and thereafter decreasing the number of active light sources in a step-wise manner as the battery energy decreases so as to maximize battery life and illumination time of the lighting device.

Another battery power consumption strategy may include limiting power provided to the light sources 20 as a function of battery energy levels. For example, the operating parameters may specify limited power supplied to the active light sources (optionally, less power than that typically provided during normal operation) and thereafter decreasing the power in a step-wise manners as the battery energy decreases so as to maximize battery life and illumination time of the lighting device.

Another battery power consumption strategy may include flashing or otherwise turning the light sources 20 on and off as a function of battery energy levels. For example, the light sources 20 may be turned on and off at certain intervals to save battery power. Optionally, the flashing may be at a frequency indistinguishable to the human eye such that light sources appear to be constantly illuminated. Still further, the light sources may be flashed at perceptible intervals to further save battery energy, especially as the battery energy decreases.

Another battery power consumption strategy may include limiting power supplied to the light sources 20 as a function of the time of day. For example, if the emergency occurs during a time of day when the path of egress receives sufficient light, illumination of the lighting devices 18 may be delayed until a point in time when the illumination is likely to be insufficient. Likewise, if the emergency occurs during a time of day when there is insufficient daylight, the light sources 20 may activated and thereafter inactivated if the time of day changes to a time when sufficient ambient light is available. The lighting device 18 may include ambient light detector (not shown) to facilitate implementing a similar consumption strategy.

These and other battery power consumption strategies may be employed to control battery consumption during emergency egress lighting when power from the main power source 16 is unavailable. As described above, any number of backup triggers (conditions) can be used to instigate backup operations and the use of the battery to power the light sources. Another such trigger may simply occur if power to the lighting device is lost, i.e., instead of the lighting device receiving an emergency alert message.

Simply triggering the backup mode as a function of a loss of power can be helpful with emergency lighting devices that are not powered on/off with a light switch as it can be assumed that an emergency has occurred if power is lost to the emergency light, i.e., emergency egress lighting devices typically are powered with energy from the power source 16 but the connection thereto may be hardwired such that it is constantly on and not controlled with a light switch. However, such functionality may be less advantageous in applications where power delivery is controlled with a light switch as the user may simply desire turning off of the lighting device 18, and not activation of emergency lighting.

To solve this problem, the backup mode may specify an override parameter for shutting off the lighting device 18. The override parameter may be based on receipt of a wireless message and/or some other operator, such as rapid cycling of the flip-switch 14 between its on/off position. Optionally, the flip-switch 14 may include a button or other feature (not shown) for generating the override message. Alternatively, the default condition may be to prevent emergency lighting until the override message is received, i.e., rather than turning off the lighting device 18, the override message may be used to permit the backup mode of operation such that when the flip-switch is off the lighting device 18 remains off unless the override message has triggered backup mode capabilities.

Once the modes of operation are programmed, the controller 28 begins to control operation according to the normal mode, as indicated in Block 54. Thereafter, the controller 28 monitors the operation conditions of the lighting device for a backup mode trigger, as indicated in Block 56. The backup mode trigger may include one of the backup conditions noted above and is used to transfer operation of the lighting device 18 from its current mode of operation to the backup mode.

Block 58 relates to operating the lighting device according to the backup mode of operation, such as to provide the emergency egress lighting. Because the lighting device 18 may need to be operational in the backup mode for an extended period of time, one or more of the battery power consumption strategies may be periodically instigated during backup operation to prolong battery life and the ability to provide the egress lighting.

Block 60 relates to monitoring the backup mode operating conditions for a normal trigger. If a normal trigger is not received, backup mode is continued until receipt of the override message and/or the battery 30 runs out of energy. If a normal trigger is received, the controller 28 reverts back to Block 54 and controlling lighting operations according to the conditions and parameters specified in the normal mode of operation.

Advantageously, the present invention limits the substantial cost of purchasing, installing and wiring unique and separate lighting devices specifically for the purpose of night lighting, emergency lighting and pathway lighting by combining the requirements for the above within one unit, one housing and one light source enclosure.

Additionally, for purposes of saving energy and improving efficiency of the system, the controller in combination with the claimed light source can provide illumination in areas not occupied or during reduced occupancy periods such as night lighting.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lighting device comprising:
   a number of light sources mounted on a common printed circuit board (PCB);
   a controller for distributing power from a main power source and a secondary battery power source to a selective one or more of the light sources according to a first mode and second mode of operation, the first mode of operation being associated with non-emergency illumination and the second mode of operation being associated with emergency illumination;
   a battery for powering the selected one or more light sources in the second mode of operation; and
   a housing defining a common enclosure for housing the light sources, controller, and battery.

2. The lighting device of claim 1 wherein the controller is configured to receive data messages and to trigger the second mode of operation in response to receipt of an emergency alert data message.

3. The lighting device of claim 2 further comprising a transceiver configured for receiving the data messages for delivery to the controller.

4. The lighting device of claim 1 wherein the controller is configured to switch from the second mode to the first mode of operation in response determining an override request.

5. The lighting device of claim 4 wherein the controller is configured to receive data messages and to determine the override request in response to receipt of an override data message.

6. The lighting device of claim 4 wherein the controller is configured to determine the override request in response to cycling on and off the main power source.

7. The lighting device of claim 1 wherein the housing includes a threadable conductor for electrically connecting the controller to a light socket such that the lighting device is suitable for use as a retro-fit of incandescent or fluorescent light bulbs.

8. The lighting device of claim 1 wherein the first mode of operation is characterized by powering the light sources with energy solely from the main power source and the second mode of operation is characterized by powering the light sources with energy solely from the battery.

9. The lighting device of claim 1 wherein the second mode of operation flashes the lighting sources so as to display an emergency warning.

10. The lighting device of claim 1 wherein the second mode of operation provides illumination having a color different than a color of the first mode of operation.

11. The lighting device of claim 1 wherein the second mode of operation illuminates less light sources than the first mode of operation.

12. The lighting device of claim 11 wherein the data transceiver is configured to relay the received data message to other remotely located lighting devices.

13. The lighting device of claim 1 further comprising a data transceiver configured to interface data messages with the controller, the controller relying on the data message to select the first or second mode of operation.

14. The lighting device of claim 1 wherein the battery is rechargeable with power from the main power supply.

15. A lighting system comprising:
    a light socket;
    a light switch for connecting the light socket to a wireline power supply, the light switch having an on state and an off state, the light switch connecting the light socket to the wireline power supply in the on state and the light switch disconnecting the light socket from the wireline power supply in the off state;
    a lighting device received within the light socket and having a number of light sources configured to provide illumination, the lighting device including a controller configured to control illumination of the light sources by controlling power flow to the light sources from the wireline power supply and a battery included within the lighting device, the controller controlling the illumination of the light sources according to at least a first and second mode of illumination, the first mode corresponding with a first illumination level and the second mode corresponding with a second illumination level providing less illumination than the first mode, the controller configured to permit the first mode of illumination only if the light switch is in the on state and to permit the second mode of illumination if the light switch is in either of the on or off states.

16. The system of claim 15 wherein the lighting device further includes a transceiver configured to interface data messages with the controller, the controller relying on the data message to select the first or second mode of illumination.

17. The system of claim 16 wherein the data transceiver is configured to relay the received data message to other remotely located lighting devices.

18. The system of claim 15 wherein the second mode of illumination includes the light sources being powered by the battery included within the lighting device.

19. A method of providing emergency egress lighting, the method comprising:

transmitting data representing an emergency alert to a lighting device having a number of light sources, a controller, and a battery, the light sources configured to provide illumination with power from a wireline power supply connected to a light socket of the lighting device or the battery included within the lighting device;

processing the emergency alert with the controller and controlling the light sources to provide emergency illumination of a portion of an emergency egress path with power from the wireline power supply if the wireline power is available or with power from the battery if the wireline power supply is unavailable; and relaying the emergency alert message to another lighting device for use in providing emergency illumination of another portion of the emergency egress path.

20. The method of claim 19 wherein providing the emergency illumination includes controlling the light source to direct occupants along the emergency egress path.

21. The method of claim 20 further comprising controlling the light source to provide less illumination than when the light sources are not providing emergency illumination.

* * * * *